Figure 1:
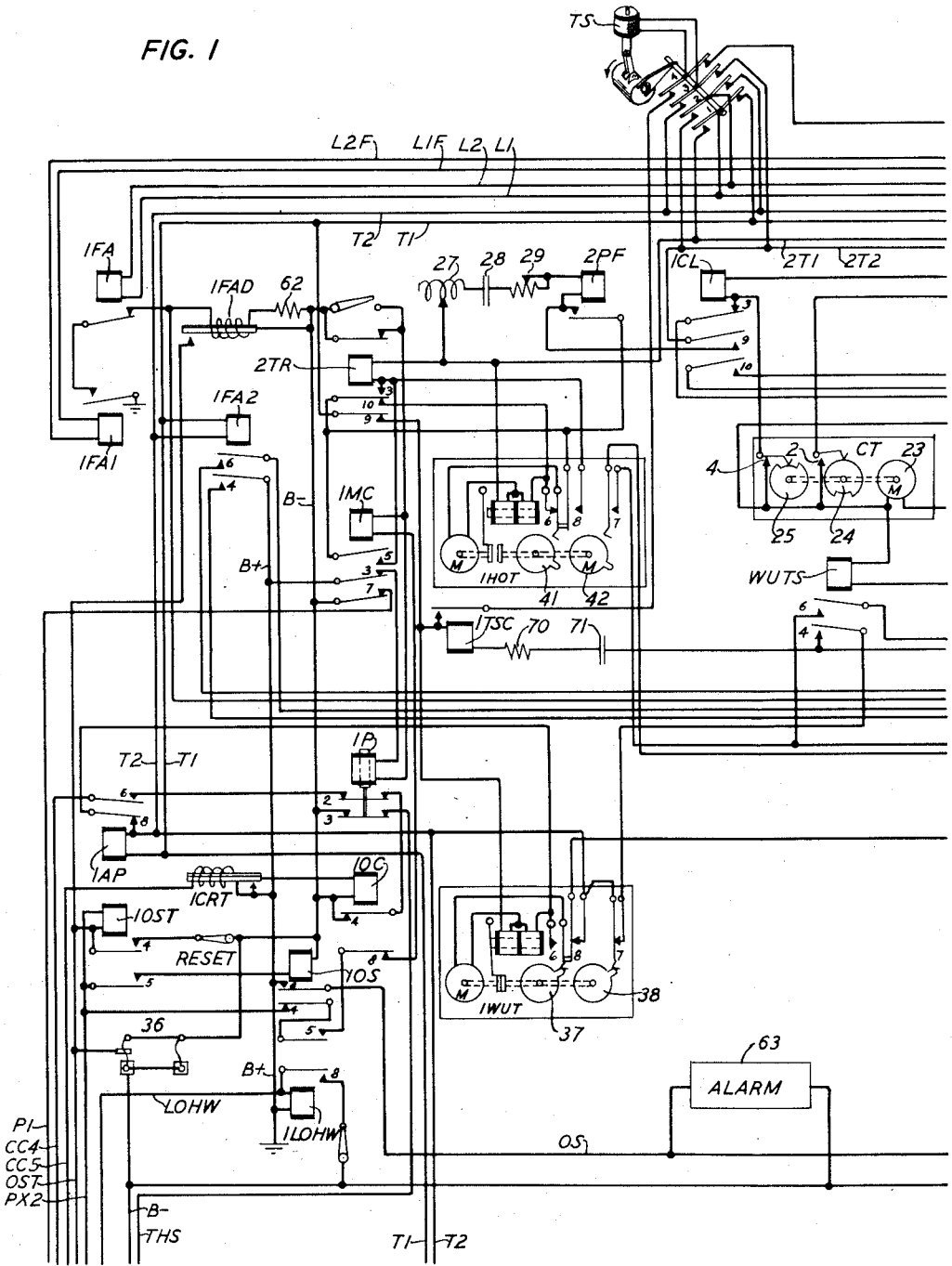

INVENTORS V. T. CALLAHAN
L. D. FRY
BY
ATTORNEY

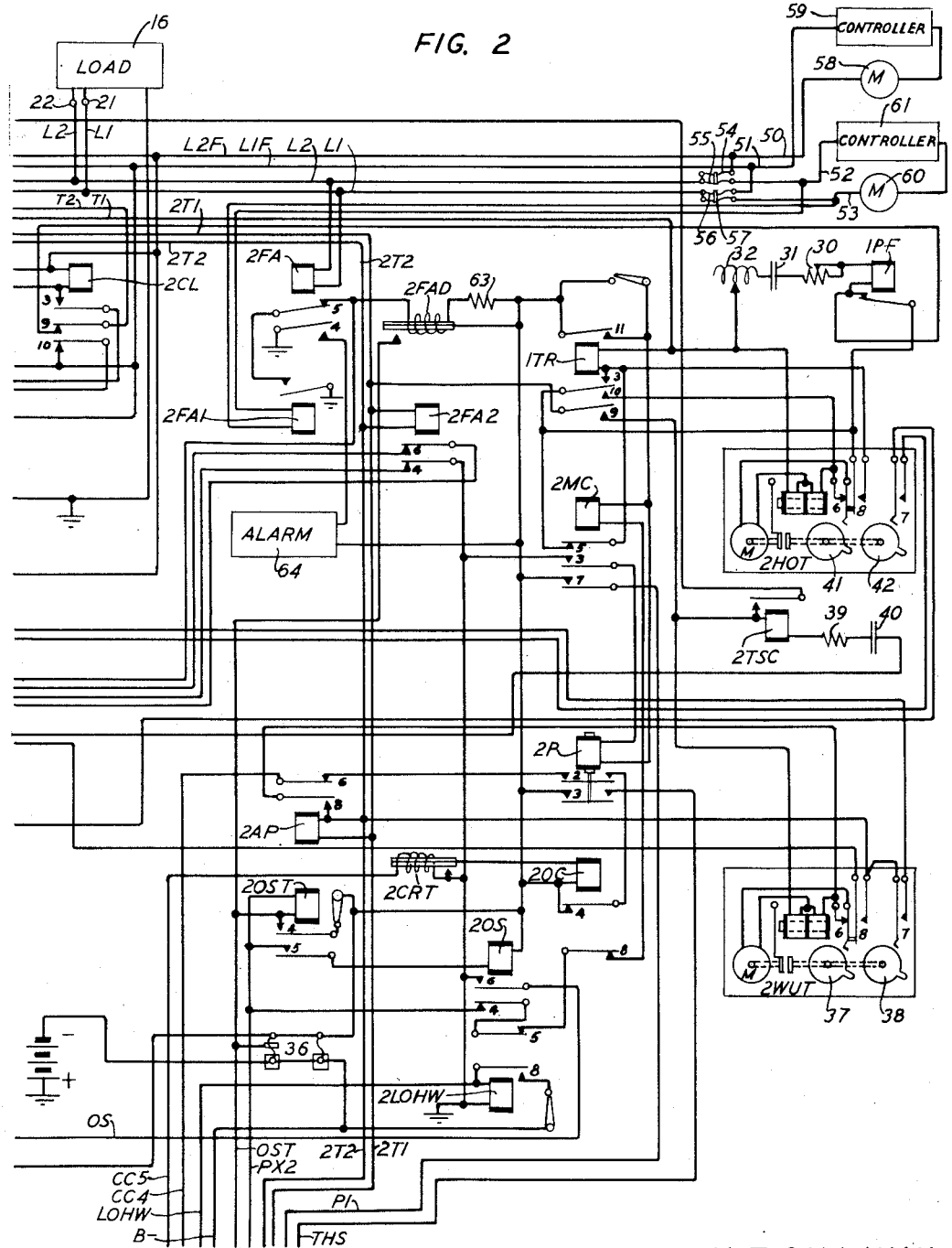

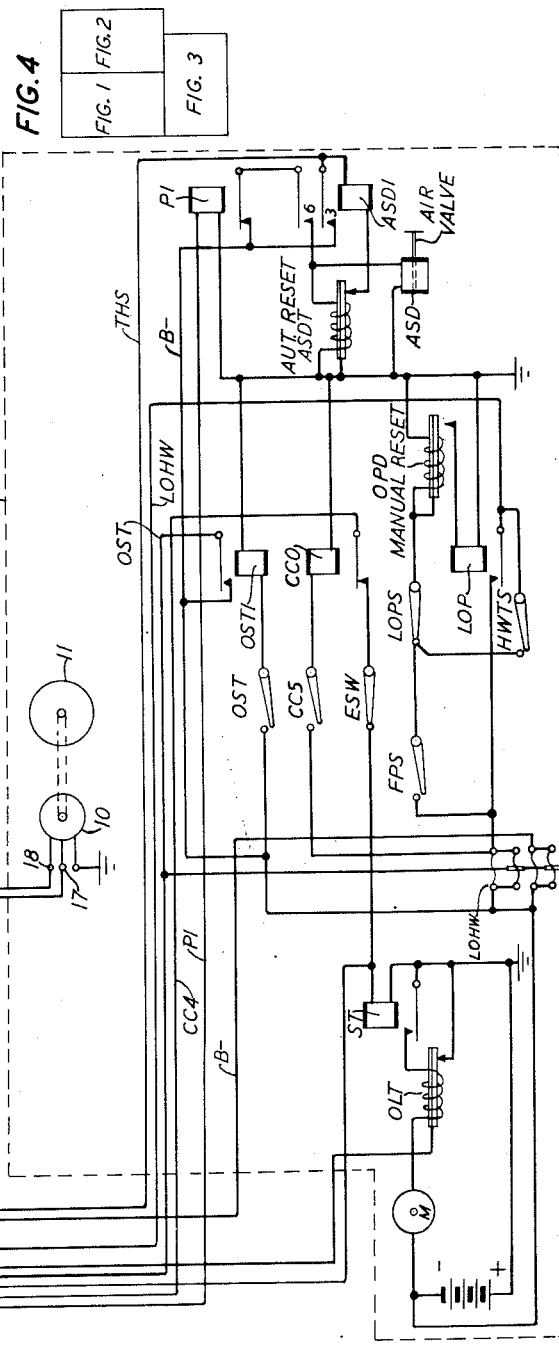

Patented Oct. 13, 1953

2,655,603

UNITED STATES PATENT OFFICE 2,655,603

POWER SUPPLY APPARATUS FOR ALTERNATELY SUPPLYING A LOAD

Vincent T. Callahan, Englewood, and Lloyd D. Fry, Chatham, N. J., assignors to Bell Telephone Laboratories, Incorporated, New York, N. Y., a corporation of New York Application August 14, 1952, Serial No. 304,316

6 Claims. (Cl. 290—4)

This invention relates to power supply apparatus and particularly to such apparatus for supplying current to a load from two engine-driven generators during alternate time periods.

In a specific embodiment of the invention herein shown and described for the purpose of illustration, there are provided two engine-driven generator sets for alternately supplying current to a load. When a first of the generators, for example, has been supplying current to the load for a predetermined period, a motor-driven cam switch closes a first circuit for controlling the starting of the engine for driving the generator of the second engine-driven generator set. If the second engine-driven generator starts, the first generator continues to supply current to the load during a period in which the output voltage of the second generator builds up. When the output voltage of the second generator has increased to a predetermined value, relay means are energized for controlling the energization of a transfer switch, after a delay period, and the transfer switch operates to transfer the load from the first generator to the second generator. If the output voltage of the second generator remains at a sufficiently high value when the load is transferred to the second generator, means are provided for shutting down the first engine-driven generator.

When the second generator has been supplying a current to the load for a predetermined time period, the cam switch closes a second circuit for controlling the starting of the first engine-driven generator, the first circuit having previously been opened by the cam switch. When the output voltage of the first generator reaches a certain operating value, the transfer switch is again operated, after a delay period, and the load is tranferred from the second generator to the first generator. Subsequently the second engine-driven generator is shut down.

Under certain abnormal operating conditions, a generator which is supplying current to the load may be shut down prior to the expiration of its normal operating period. In this case the second engine-driven generator is started and, when its output voltage reaches an operating value, the transfer switch is operated with a minimum delay to transfer the load to the second generator. In order to restart the first generator after the cause of its failure has been corrected, it is necessary to reset certain relays manually. If, after one of the engine-driven generators has been started and the load has been transferred to it, the generator output voltage should drop below a predetermined value, means are provided for preventing the stopping of the second engine-driven generator and the load is transferred back to the second generator.

Each of the engine-driven generator sets which alternately supply current to the load is provided with motor operated air recirculating louvers, the motor and its controller being connected across the load through fuses. Relay means are provided for operating an alarm when one of the fuses blows and for blocking the operation of the alarm in response to failure of load voltage while one of the generators is operating to produce an output voltage. However, there is provided a second alarm which is operated in response to load voltage failure. Relay means are also provided for causing the operation of the first mentioned alarm in the event that both generators fail to produce output voltage, the second alarm also being operated for this condition due to failure of voltage across the load.

Figs. 1, 2 and 3, when placed with respect to each other as shown in the diagram of Fig. 4, are a schematic view of a power supply apparatus embodying the invention.

Referring to the drawing there are provided for supplying alternating current to a load 16 during alternate time periods two similar diesel engine driven, three phase alternators. One of the alternators 10 driven by a diesel engine 11 and control apparatus therefor are shown within the dash line enclosure 14. The apparatus included within a box 15 is the same as that provided within the enclosure 14, and includes the second alternator 12 driven by a diesel engine 13. The apparatus is designed so that one of the engines will run for a desired period, say twelve hours, and then the other engine will run for a desired period of say twelve hours, etc.

One of the output terminals of each of the alternators 10 and 12, and one of the load terminals are connected to ground. The remaining output terminals of the alternators, respectively, are connected to the load 16 through contacts of a transfer switch TS. With the switch TS in the position shown in the drawing, output terminal 17 of alternator 10 is connected by way of T1 through armature 1 of transfer switch TS to line L1 going to terminal 21 of load 16. Output terminal 18 of alternator 10 is connected by way of line T2 through armature 2 of transfer switch TS to line L2 going to a terminal 22 of load 16. When transfer switch TS is energized, output terminal 19 of alternator 12 is connected by way of lead 2T1 through armature 1 of transfer switch TS to line L1 going to load terminal 21 and output terminal 20 of alternator 12 is connected by way of lead 2T2 to armature 2 of transfer switch TS to line L2 going to load terminal 22. The switch TS is of the type in which a shaft carrying the switch armatures 1, 2, 3 and 4 is rotated alternately in opposite directions in response to successive pulses of energy supplied to the electromagnet of the switch. Therefore, when the switch TS is subsequently again energized the switch armatures 1, 2, 3 and 4 will be moved back to the position shown in the drawing to reconnect the load to alternator 10.

There is provided a cycle timer CT comprising a motor 23 for driving the cams 24 and 25 at a rate such that the cams make a complete revolution in twenty-four hours for example, contacts 2 and 4 of the cycle timer CT being closed alternately. One terminal of motor 23 is grounded and the other terminal is connected to lead L1F and thence through a fuse 56 to line L1 going to load terminal 21, thereby energizing the motor.

The apparatus and its operation will be further described assuming that diesel engine 11 is about to complete twelve hours of operation. It should be noted that contact 4 of cycle timer CT opened about one-half hour after the starting of engine 11 and that relay 1CL remained energized, after the opening of contact 4 of CT, by current supplied over a circuit from line L1, line L1F, contact 10 of relay 2CL, contact 3 of relay 1CL, winding of 1CL, line L2F, fuse 54 to line L2, L1 and L2 being connected to load terminals 21 and 22, respectively. When contact 2 of the timer CT closes, relay 2CL is energized due to the completion of a circuit traced from line L1 through line L1F, contact 2 of timer CT, the winding of relay 2CL and line L2F to line L2. Contact 10 of relay 2CL opens due to the operation of relay 2CL to cause relay 1CL to release, and contact 3 of relay 2CL closes to lock up relay 2CL. The release of relay 1CL completes a circuit from output terminal 19 of alternator 12 through lead 2T1, reactor 27, condenser 28, rheostat 29, winding of power failure relay 2PF, contact 9 of relay 1CL and lead 2T2 to input terminal 20 of generator 12, thereby completing an energizing circuit for relay 2PF when alternator 12 is driven by the engine 13. Operation of relay 2CL opens its contact 9 to open a circuit comprising line T2, contact 9 of relay 2CL, winding of power failure relay 1PF, rheostat 30, condenser 31 and reactor 32 to line T1, thereby releasing relay 1PF. Release of relay 1PF opens at its contact the circuit from line T2 through contact 9 of relay 2CL, the contact of relay 1PF, the contact 3 and the winding of transfer relay 1TR to line T1, thereby releasing relay 1TR.

Four circuits are affected by the release of relay 1TR. Contact 3 of relay 1TR opens to remove the lock-up path for that relay. Contact 9 of relay 1TR closes to prepare a circuit for transfer switch TS so that it will operate when transfer switch control relay 2TSC operates at the end of the operation of the hold-over timer 1HOT, contact 7, and the warm-up timer 2WUT, contact 8. The energizing circuit for transfer switch TS may be traced from line 2T1, contact 9 of relay 1TR, the contact of relay 2TSC, armature 4 of transfer switch TS, the winding of switch TS and armature 3 of switch TS to line 2T2. Contact 10 of relay 1TR closes and prepares the circuit to hold-over timer 2HOT when engine 13 is operating and engine 11 is warming up for the next operating period. Contact 11 of relay 1TR closes to complete a circuit from negative battery through fuse 36, contact 11 of relay 1TR, winding of main control relay 2MC, contact 3 of overcranking relay 2OC, contact 5 of low oil pressure and high water temperature relay 2LOHW, contact 4 of over-speed trip relay 2OS, lead PX2 to apparatus 15 and over-load timer OLT to ground, thereby operating relay 2MC.

With the main control relay 2MC operated, contact 5 thereof opens so that relay 1TR will not operate immediately upon return of power from generator 10. Contact 3 of relay 2MC closes to complete a circuit from ground through contact 3 of relay 2MC, winding of pilot relay 2P, contact 11 of relay 1TR and fuse 36 to negative battery, thereby operating relay 2P. Contact 7 of relay 2MC closes to complete a circuit from negative battery, through fuse 36, contact 7 of 2MC, lead P1 of apparatus 15 and relay P1 to ground, thereby operating relay P1 of apparatus 15 which is the control relay for the engine air shut-down circuit.

The operation of pilot relay 2P affects two circuits. Contacts 3 of relay 2P close to complete a circuit from negative battery through contacts 3 of relay 2P, lead THS to apparatus 15, winding of relay ASD1 and contact of thermal relay ASDT of apparatus 15 to ground. Relay ASD1 operates and locks up through its contact 3. Operation of relay ASD1 prepares, through its contact 6, an energizing circuit for operating the air shut-down valve ASD for engine 13 if relay P1 releases because of intentional shutdown or trouble shutdown. Contacts 2 of relay 2P close to apply negative battery through contact 4 of relay 2OC, contact 2 of relay 2P, contact 6 of relay 2AP, lead CC4 going to apparatus 15, contact of cranking cut-out relay CCO, emergency switch ESW and winding of starting contactors ST to ground, thereby operating the starting contactor ST. Operation of contactor ST completes a circuit for operating starting motor M for cranking the diesel engine 13. After the engine fires and reaches a speed of seven hundred to eight hundred revolutions per minute, the contacts of cranking cut-out switch CC5 close to cause the cranking cut-out relay CCO to operate, thereby opening the energizing circuit for starting relay ST causing it to release. The relay CCO is operated all of the time that the engine is running.

After engine 13 has started and is driving the alternator 12, engine 11 continues to drive alternator 10 for a subsequent period and the output of alternator 10 continues to supply current to the load. When the output voltage of alternator 12 builds up to about 94 per cent of normal voltage, power failure relay 2PF and alternator potential relay 2AP are energized by way of leads 2T1 and 2T2 to cause the operation of these relays. Operation of relay 2AP opens at its contact 6 the energizing circuit for starting contactor ST. The closing of contact 8 of relay 2AP completes, through contact 9 of relay 1TR, a circuit for supplying current from alternator 12 over leads 2T1 and 2T2 to warm-up timer 2WUT causing its motor M to run and its clutch to engage to drive the cams 37 and 38. When relay 2WUT has operated for about four and one-quarter minutes, its contact 8 closes to prepare a partial energizing circuit for relay 2TSC comprising lead 2T1, contact 9 of relay 1TR, winding of relay 2TSC, resistor 39, condenser 40, open contact 7 of hold-over timer 1HOT, contact 8 of timer 2WUT to lead 2T2, this circuit being completed when contact 7 of timer 1HOT closes, as will be described below.

When power failure relay 2PF operates, it completes a circuit from lead 2T1 to hold-over timer 1HOT, contact 10 of relay 2TR, contact of relay 2PF and contact 9 of relay 1CL to lead 2T2 to cause the operation of timer 1HOT. The clutch of the timer engages and its motor 10 drives the cams 41 and 42. The hold-over timer has a four and three-quarter minute control, contact 8 operated by cam 41, set to prevent stopping of engine 11 in case the operation of engine-alternator 12, 13 is not satisfactory to assume the load. It also has a four and one-half minute control, contact 7 operated by cam 42, to permit transferring the load from alternator 10 to alternator 12.

The closing of contact 7 of timer 1HOT completes a circuit from lead 2T2 through contact 8 of timer 2WUT, contact 7 of 1HOT, condenser 40, resistor 39, winding of relay 2TSC, contact 9 of relay 1TR to lead 1T1, causing relay 2TSC to operate. A circuit is thus completed from lead 2T1 through contact 9 of relay 1TR, contact of relay 2TSC, armature 4 of transfer switch TS, the winding of TS, armature 3 of TS to lead 2T2. The transfer switch TS is thus operated to transfer the load from alternator 10 to alternator 12.

When contact 8 of timer 1HOT closes, a circuit is completed from lead 2T2 through contact 9 of relay 1CL, contact of relay 2PF, contact 8 of timer 1HOT, winding of relay 2TR to lead 2T1, thereby operating transfer relay 2TR. Relay 2TR locks up through its contact 3 and the contact of relay 2PF. The energizing circuit for timer 1HOT is opened at contact 10 of relay 2TR to release timer 1HOT. The opening of contact 9 of relay 2TR opens the circuit through the contact of relay 1TSC going to a contact and armature 4 of transfer switch TS, thus leaving switch TS ready to be operated to transfer the load from alternator 12 to alternator 10 at the end of the twelve hour period of operation of alternator 12, or in the event that alternator 12 fails during the twelve hour operating period. The opening of contact 11 of relay 2TR opens the energizing circuit for main control relay 1MC to cause it to release.

Release of relay 1MC opens the circuit from negative battery through contact 7 of relay 1MC, lead P1, winding of relay P1 of apparatus 14 to ground, causing relay P1 to release. A circuit is thus completed from negative battery through lead B−, contact 6 of relay P1, contact 6 of relay ASD1 and air shut-down valve ASD to ground, thereby operating the air shut-down valve ASD to stop engine 11. The energizing circuit for pilot relay 1P is opened at contact 3 of relay 1MC and at contact 11 of relay 2TR. Release of relay 1P opens at its contact 3 the energizing circuit for relay ASD1 of apparatus 14. The circuit for operating start relay ST of apparatus 14 is opened at contacts 2 of relay 1P. The ASDT timer operates to release ASD1 and after it cools, the circuit is then restored to normal with engine alternator 10, 11 ready to take over the load at the end of a twelve hour operating period of engine-alternator 12, 13 or if the engine alternator 12, 13 should fail for any reason.

The operation of restarting the engine-alternator 10, 11 and the transfer of the load from alternator 12 to alternator 10 is similar to that described above for starting engine 13 and for transferring the load from alternator 10 to alternator 12. Stated briefly, when contact 4 of cycle timer CT closes, relay 1CL is energized to cause its operation and to cause relay 2CL to release relays 2PF and 2TR. Relays 1MC and 1P are operated to cause the operation of relay P1 and start relay ST of apparatus 14. The engine 11 is thus started to cause it to drive alternator 10 and when its voltage builds up, relays 1AP and 1PF operate. Warm-up timer 1WUT and hold-over timer 2HOT are energized and relay 1TSC is operated. A resistor 79 and a condenser 71 are provided in circuit with the winding of relay 1TSC as are the resistor 39 and condenser 40 in circuit with the winding of relay 2TSC to prevent relay operation if both frequency and voltage are not correct. The transfer relay TS is energized to transfer the load from alternator 12 to alternator 10.

When either engine-alternator 10, 11 or engine-alternator 12, 13, while carrying the load is shut down due to low oil pressure, high water temperature or over speeding, as will be described below, the associated power failure relay PF, the cycle-timer relay CL and the warm-up timer short circuiting relay WUTS are released. Assume, for example, that engine alternator 10, 11 is carrying the load and that it is shut down due to one of the above causes, power failure relay 1PF, cycle-timer relay 1CL and warm-up timer short-circuiting relay WUTS are released. When relay 1PF releases, its contact opens to cause transfer relay 1TR to release. Contact 11 of relay 1TR closes to cause relay 2MC to operate and the operation of relay 2MC completes a circuit causing relay 2P to operate. The engine 13 is thus caused to start as previously described. Then power failure relay 2PF and alternator potential relay 2AP are operated, as described above. As soon as the output voltage of alternator 12 builds up to the required voltage, warm-up timer 2WUT starts to operate and at the end of a period of fifteen to twenty-five seconds, the transfer switch control relay 2TSC is operated because of the completion of an energizing circuit from lead 2T2, through contact 7 of timer 2WUT, contact 6 of relay WUTS, condenser, 40, resistor 39, winding of relay 2TSC and contact 9 of relay 1TR to lead 2T1. When relay 2TSC operates, its contact closes to complete a circuit for supplying from alternator 12 to transfer switch TS, causing it to operate and transfer the load to alternator 12. Alternator 12 will then carry the load until the trouble condition on engine-alternator 10, 11 has been corrected.

If the engine lubricating oil pressure drops too low or if the engine cooling liquid temperature becomes too high, the engine 11 or 13 is stopped automatically. When the lubricating oil pressure for engine 11, for example, rises to 10 pounds per square inch, the contacts of the low oil pressure switch LOPS open. When the fuel oil pressure rises to 6 pounds per square inch, the contacts of fuel oil pressure switch FPS close. The opening of contacts LOPS and the closing of contacts FPS prepare the protective circuits to shut the engine down in case LOPS closes because lubricating oil pressure drops below 10 pounds per square inch, or in case high water temperature switch HWTS closes because the cooling liquid temperature reaches a certain abnormally high value. To prevent false operation of the low oil pressure switch shutdown during the starting period, if the fuel oil pressure should build up sufficiently to close the fuel oil pressure switch contacts before the contacts of LOPS open, the oil pressure delay thermal relay OPD is provided.

If the fuel oil pressure switch FPS contacts and the contacts of LOPS are closed at the same time for a period of twenty to thirty-five seconds, the OPD heater closes the OPD contacts and relay LOP is operated. When relay LOP operates, or when the contacts of HWTS close, a circuit is completed from negative battery through the contacts of HWTS or through the contacts of relay LOP, lead LOHW and winding of relay 1LOHW to ground, thereby causing relay 1LOHW to operate and to lock up through its contact 8. Contact 5 relay 1LOHW opens to release relay 1MC to cause the engine 11 to stop. Engine 13 will then be started as described above, and current will be supplied to the load from alternator 12. The cycle timer will continue to operate and contact 4 will subsequently close. Relay 1CL will operate and relay 2CL will release. When contact 9 of 1CL opens, power failure relay 2PF releases and transfer relay 2TR releases. Contact 11 of 2TR closes but main control relay 1MC cannot operate to start engine 11 because contact 5 of relay 1LOHW is open. Therefore, engine 11 cannot be started and the load will continue to be supplied from alternator 12.

If the starting motor current is excessive such as would occur if the engine bearings seize, thermal relay OLT operates to open the energizing circuit for relay 1MC or 2MC, causing relay 1P or 2P to release to open the starting circuit by opening contacts 2 of the 1P or 2P relay and the motor M of apparatus 14 or apparatus 15 cannot crank the engine 11 or the engine 13 until the relay OLT is reset manually. The alternator which is carrying the load will continue to do so.

When relay 1P operates to complete a circuit for operating the starting relay ST of apparatus 14 for example, a circuit is also closed from negative battery through contact 4 of over-cranking relay 1CC, contacts 2 of relay 1P, contact 6 of relay 1AP, lead CC4, contacts of relay CCO, contacts of switch ESW, lead CC5 and the heater of thermal switch 1CRT to ground, thereby operating relay 1CRT to cause it to close its contacts after a delay period of about thirty-five seconds if the engine has not started in that time. Relay 1OC is thus energized to cause it to open at its contact 4 the energizing circuit for starting contactor ST and, at its contact 8 the energizing circuit for relay 1MC. Subsequently, the engine cannot be cranked until the relay 1CRT is reset by hand.

When the engine speed reaches 1360 to 1430 revolutions per minute, the over-speed trip switch OST closes its contacts to complete an energizing circuit for causing the operation of relay OST1 of apparatus 14, for example. A circuit is thus completed from negative battery through contact of relay OST1, lead OST, winding of over-speed trip relay 1OST, lead PX2 and relay OLT to ground, thereby causing relay 1OST to operate and lock up through its contact 4. Closing of contact 5 of relay 1OST completes an energizing circuit for relay 1OS. Contact 6 of relay 1OS is closed to energize an alarm circuit 63. Contact 4 of relay 1OS opens to interrupt the energizing circuit for relay 1MC, thereby stopping the engine 11. To subsequently start engine 11 it is necessary to manually reset the relay 1OST. If any of the battery fuses of apparatus 14 or 15, or if either of the discharge fuses 36 blows, an energizing circuit is completed for operating the 1OST or the 2OST relay to stop the engine 11 or 13 respectively.

There are provided a motor 58 for operating air recirculating louver for engine 11 and a motor 60 for operating air recirculating louver for engine 13, the circuits for energizing motors 58 and 60 being completed by controllers 59 and 61, respectively. Whether these louvers are open or shut depends upon the position of the controller which, in turn, depends upon the room temperature. When the controller 59 is in a position to complete an energizing circuit for motor 58, current is supplied from alternator 10 to a circuit comprising lead T1, lead L1, fuse 56, lead 51, controller 59, motor 58, lead 50, fuse 54, line L2 and line T2. Similarly, when the controller 61 is in a position to complete an energizing circuit for motor 60, current is supplied from alternator 12 to a circuit comprising lead 2T1, lead L1, fuse 57, lead 53, motor 60, controller 61, lead 52, fuse 55, line L2 and line 2T2.

If fuse 54 or 56 should blow, relay 1FA1 is released. If relay 1FA is operated, the release of relay 1FA1 completes a circuit from ground through a contact of relay 1FA, winding of thermal relay 1FAD, resistor 62 to negative battery. After a delay period of 1.5 to 2.5 minutes, relay 1FAD operates to complete a circuit for energizing relay 1OST. Operation of relay 1OST completes a circuit for causing relay 1OS to operate, thereby completing a circuit for energizing the alarm 63. If relay 1FA should be released, however, due to no voltage across line L1, L2 going to the load, the relay 1FAD will not be energized and the alarm 63 will not be energized. Similarly, if fuse 55 or 57 should blow a circuit is completed for energizing the alarm 63, relay 2FAD being energized through a circuit comprising a resistor 63, heater of 2FAD and contacts of relays 2FA and 2FA1.

In the event that neither alternator 10 nor alternator 12 is running so that no output voltage is produced across leads T1, T2 and no output voltage is produced across leads 2T1 and 2T2, relay 1FA2 and relay 2FA2 will both be released since the winding of relay 1FA2 is connected across leads T1 and T2, and the winding of relay 2FA2 is connected across leads 2T1 and 2T2. In this case an energizing circuit for relay 1FAD is completed through contact 6 of relay 2FA2 and contact 4 of relay 1FA2, and an energizing circuit for relay 2FAD is completed through contact 6 of relay 1FA2 and contact 4 of relay 2FA2. Relays 1FAD and 2FAD will, therefore, operate to cause the energization of the alarm circuit 63. In this case an alarm 64 will also be energized under control of relay 2FA. Relay 2FA will release due to no voltage across the load line L1, L2 to cause it to close its contact 4, thereby connecting ground to alarm circuit 64 to complete an energizing circuit from negative battery for the alarm circuit 64.

This application discloses but does not claim subject-matter that is disclosed and claimed in our application serial No. 304,317, filed August 14, 1952.

What is claimed is:

1. In an electrical generating system having two engine-driven generator units, a load circuit, a transfer switch for connecting either of said generators to said load circuit, a cam switch system having first and second pairs of normally open contacts successively closed during alternate time intervals, and first and second relay systems successively energized by the closures of said first and second pairs of contacts to respectively shut down one of said units, to start the other of said units and to energize said transfer switch to transfer the load circuit from the one of said generators to the other of said generators.

2. In combination, a first and a second engine-driven generator unit for alternately supplying current to a load during successive predetermined time periods, a transfer switch responsive to the energization thereof for transferring said load from one of said generator units to the other, means operative in response to a predetermined elapsed time interval following the starting of said first generator unit and while said first generator unit is supplying current to said load for starting said second generator unit, means responsive to a predetermined voltage generated by said second generator unit for causing the operation of said transfer switch to cause it to transfer the load from said first generator unit to said second generator unit and means for stopping said first generator unit after the transfer of said load to said second generator unit.

3. In combination, a first and a second engine-driven generator for normally alternately supplying current to a load during successive predetermined time periods, a transfer switch responsive to the energization thereof for transferring said load from one of said generators to the other, means for normally starting said second engine-driven generator while said first engine-driven generator is running and supplying current to the load, means operated after a predetermined delay period following the time at which said second engine-driven generator generates a certain output voltage for energizing said transfer switch and means operated in response to failure of said first engine-driven generator to supply current to said load for starting said second engine-driven generator and for energizing said transfer switch after a delay period which is small relative to said predetermined delay period following the time at which said second engine-driven generator generates a certain output voltage.

4. In combination, a first and a second engine-driven generator for normally alternately supplying current to a load during successive predetermined time periods, a transfer switch responsive to the energization thereof for transferring said load from one of said generators to the other, means for normally starting said second engine-driven generator while said first engine-driven generator is running and supplying current to the load, means operative under an abnormal condition for starting said second engine-driven generator in response to failure of said first engine-driven generator to supply current to the load, timing means having a first circuit closing means which is closed after a first predetermined operating period of said timing means and having a second circuit closing means which is closed after a second predetermined operating period of said timing means less than said first operating period, means responsive to a certain output voltage of said second engine-driven generator for initiating the operation of said timing means, means responsive to the closure of said first circuit closing means for causing the energization of said transfer switch when said first engine-driven generator is supplying current to the load under a normal operating condition, relay means having contacts which are closed in response to failure of said first engine-driven generator to supply current to the load under an abnormal operating condition and means responsive jointly to the closure of said contacts of said relay means and to the closure of said second circuit closing means for causing the energization of said transfer switch.

5. In combination, a first and a second engine-driven generator for alternately supplying current to a load during normal operation, means for transferring said load from one of said generators to the other generator, means for starting said second generator while said first generator is supplying current to the load, means responsive to a first predetermined voltage generated by said second generator for causing the operation of said transfer means to cause it to transfer the load from said first generator to said second generator, means for normally stopping said first engine-driven generator after said second generator is supplying current to the load and for preventing the stopping of said first engine-driven generator under an abnormal condition when the voltage generated by said second generator drops to a second predetermined voltage less than said first predetermined voltage substantially at the time that said load is transferred to said second generator.

6. In combination, a first and a second engine-driven generator for alternately supplying current to a load during normal operation, a transfer switch for transferring the load from one of said generators to the other generator, a timing means having a first and a second circuit closing means, means for closing said first circuit closing means and means for closing said second circuit closing means subsequent to the closing of said first circuit closing means, means responsive jointly to the closing of said first circuit closing means and to a predetermined voltage generated by said second generator for causing the operation of said transfer switch to transfer said load from said first generator to said second generator and means responsive jointly to the closing of said second circuit closing means and to a predetermined voltage generated by said second generator for stopping said first engine-driven generator.

VINCENT T. CALLAHAN.
LLOYD D. FRY.

References Cited in the file of this patent

UNITED STATES PATENTS

| Number | Name | Date |
|---|---|---|
| Re 16,917 | Williams | Mar. 27, 1928 |
| 1,386,972 | Sunderland et al. | Aug. 9, 1921 |
| 1,528,071 | Moss et al. | Mar. 3, 1925 |
| 1,707,296 | Brotz | Apr. 9, 1929 |
| 1,795,053 | Strong | Mar. 3, 1931 |
| 1,851,989 | Seeger | Apr. 5, 1932 |
| 1,866,494 | Strong | July 5, 1932 |
| 1,888,856 | Fuller | Nov. 22, 1932 |
| 2,006,523 | Strong | July 2, 1935 |
| 2,255,743 | Jervis | Sept. 9, 1941 |
| 2,386,638 | Spencer | Oct. 9, 1945 |
| 2,563,659 | Purington | Aug. 7, 1951 |
| 2,616,054 | Rady | Oct. 28, 1952 |